Jan. 1, 1952  H. N. ERISKIN  2,580,902
AUXILIARY AIR INLET FOR INTERNAL-COMBUSTION ENGINES
Filed Dec. 7, 1948
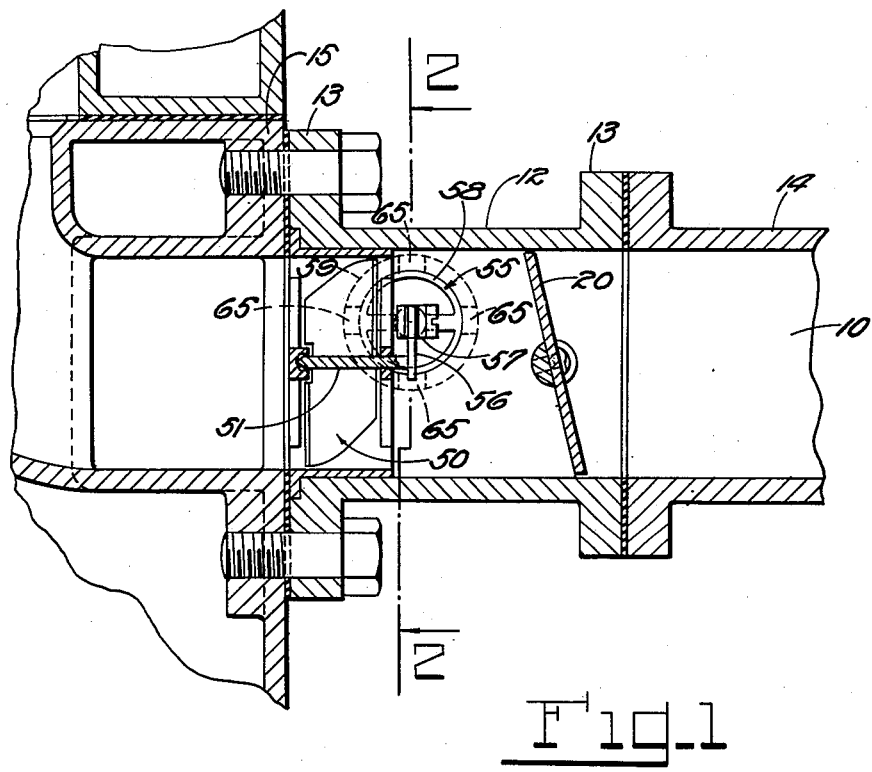
Fig.1
Fig.2
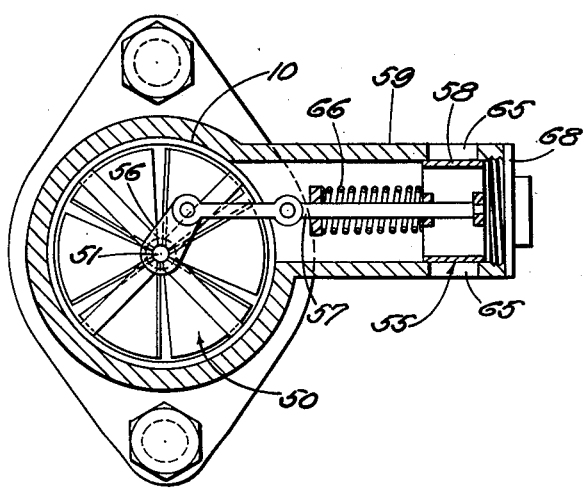
Fig.3
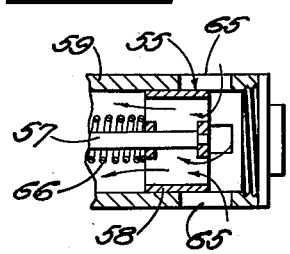
INVENTOR:
H. Nagmi Eriskin
by Dike, Calvert & Porter
Attys.

Patented Jan. 1, 1952

2,580,902

UNITED STATES PATENT OFFICE 2,580,902

AUXILIARY AIR INLET FOR INTERNAL-COMBUSTION ENGINES

Huseyin Nazmi Eriskin, Galata-Istanbul, Turkey

Application December 7, 1948, Serial No. 63,886

1 Claim. (Cl. 261—63)

This invention relates to carburetors for internal combustion engines and particularly to a device for increasing the efficiency and economy of fuel consumption at high engine speeds.

In the usual carburetors such as those used on automobile engines, for open throttle conditions the carburetor is adjusted for maximum efficiency of fuel and air mixture at a predetermined engine speed and load. At higher engine speeds the efficiency drops off because the fuel mixture becomes too rich at the predetermined fuel-air ratio. Therefore, for engine speeds beyond the maximum pre-adjusted efficiency conditions fuel is wasted and the engine suffers a corresponding power loss.

It is an object of my invention to provide means associated with a carburetor for increasing fuel economy and engine efficiency at engine speeds greater than those for which a predetermined fuel-air adjustment has been made for maximum engine efficiency at such speeds.

Accordingly, my invention provides means for automatically admitting more air to the fuel-air intake passage from the carburetor to the engine intake manifold at speeds beyond the maximum speeds of the engine for which the carburetor has been pre-adjusted for greatest efficiency. The example described is illustrative and is not intended to limit the scope of the invention beyond the requirements of the prior art.

In the drawings:

Fig. 1 shows a longitudinal section through the intake passage for the fuel-air mixture from the carburetor to the intake manifold of the engine including the device of the invention;

Fig. 2 is a cross-section taken on the lines 2—2 of Fig. 1; and

Fig. 3 is a partial view of Fig. 2 showing one operative position of the parts.

In the drawings in the intake passage for fuel and air mixture from the carburetor 14 to the intake manifold 15 is shown at 10. In this example it is shown as passing through a separate member 12 which by flanges 13 may conveniently be bolted to the carburetor 14 and to the engine intake manifold 15. A main throttle valve 20 of the butterfly type is located in the passage 10 and is shown in closed position.

A fan shaped rotor 50 is rotatably mounted in the passage 10 within the member 12 and on the engine side of the throttle valve 20 with its shaft 51 positioned in the axis of the passage 10 and it is rotatably responsive to the flow of gases comprising the mixture of fluid fuel and air through the passage 10 from the carburetor. The rotor 50 is operatively connected to open an air intake valve indicated at 55 when it is rotated in a counter-clockwise direction as viewed in Fig. 2 by the passage of fuel-air gases in the passage 10 at high engine speeds. A crank 56 on the shaft 51 is connected to the stem 57 of a cylindrically shaped hollow sleeve valve member 58 which is slidably mounted in an air intake valve housing 59 leading into the passage 10. The housing 59 has symmetrically disposed air intake passages 65 near its head 68 and the valve member 58 is normally positioned as shown in Fig. 2 to close off the intake passages 65 except when it is moved to the left by rotation of the rotor 50 against the pressure of a spring 66. The tension of the spring 66 against the valve member 58 is adjustable by any convenient means.

When the engine speed is increased beyond the speed of maximum efficiency of fuel and air mixture for the pre-adjustment of the carburetor the tension of the spring 66 is so adjusted that with increased suction in the fuel-air passage 10 and consequent increase of the rate of flow of the fuel-air mixture past the rotor 50 the rotor will rotate to move the valve member 58 to the left as shown in Fig. 3 thus opening the ports or passages 65 to take in air from the atmosphere through the interior of the valve member 58 and the housing 59 and into the passage 10 thereby increasing the proportion of air to solid fuel which is taken into the intake manifold 15 of the engine. As soon as speed is reduced, the valve member 58 again moves to the right shutting off the extra air supply and re-establishing the pre-adjusted fuel-air ratio.

I claim:

In combination with the intake of an internal combustion engine and a carburetor therefor, a cylindrical fuel-air passage between said carburetor and said engine, an auxiliary atmospheric air intake valve housing connected at right angles to said fuel-air passage, a winged rotor in said fuel-air passage coaxial with said passage, and a crank connected to the shaft of said rotor, said auxiliary air intake valve housing having an air intake port in the wall of its outer end, a sleeve valve member axially slidable in said housing for closing and opening said port and having a stem connected at one end to the crank of said rotor, and a spring holding said sleeve valve member in normally closed position, said rotor being responsive to a predetermined rate of flow of fuel and air in said passage, and operating to open said auxiliary atmospheric air intake valve against the force of said spring above a predetermined engine speed.

HUSEYIN NAZMI ERISKIN.

REFERENCES CITED

The following references are of record in the file of this patent:

UNITED STATES PATENTS

| Number | Name | Date |
|---|---|---|
| 1,084,041 | Seager | Jan. 13, 1914 |
| 1,235,189 | Cuff | July 31, 1917 |
| 1,361,900 | Payne | Dec. 14, 1920 |
| 1,823,346 | Burdick | Sept. 15, 1931 |
| 2,207,152 | Huber | July 9, 1940 |